United States Patent [19]
Williams et al.

[11] Patent Number: 5,935,884
[45] Date of Patent: Aug. 10, 1999

[54] WET-LAID NONWOVEN NYLON BATTERY SEPARATOR MATERIAL

[75] Inventors: Richard C. Williams, Erie; James A. Goettmann; Gerald L. Funk, both of North East, all of Pa.; Linda M. Gee, Brookline, Mass.; Roland Smith, Gainsville, Ga.; Timothy Connolly, Franklin; Ashish Mathur, Mansfield, both of Mass.

[73] Assignee: BBA Nonwovens Simpsonville, Inc., Simpsonville, S.C.

[21] Appl. No.: 08/801,774

[22] Filed: Feb. 14, 1997

[51] Int. Cl.⁶ .................. B32B 5/02; B32B 27/34
[52] U.S. Cl. .................. 442/364; 162/146; 162/157.3; 442/415
[58] Field of Search .................. 162/146, 157.3; 442/364, 415

[56] References Cited

U.S. PATENT DOCUMENTS

| | | | |
|---|---|---|---|
| 3,344,013 | 9/1967 | Fahrbach | 161/150 |
| 3,615,865 | 10/1971 | Wetherell | 136/146 |
| 4,205,122 | 5/1980 | Miura et al. | 429/144 |
| 4,216,280 | 8/1980 | Kono et al. | 429/247 |
| 4,216,281 | 8/1980 | O'Rell et al. | 429/252 |
| 4,233,379 | 11/1980 | Gross et al. | 429/247 |
| 4,264,691 | 4/1981 | O'Rell et al. | 429/250 |
| 4,265,985 | 5/1981 | O'Rell et al. | 429/225 |
| 4,279,979 | 7/1981 | Benson et al. | 429/254 |
| 4,330,602 | 5/1982 | O'Rell et al. | 429/206 |
| 4,699,858 | 10/1987 | Nakao et al. | 429/254 |
| 5,091,275 | 2/1992 | Brecht et al. | 429/247 |
| 5,141,523 | 8/1992 | Catotti et al. | 29/623.5 |
| 5,158,844 | 10/1992 | Hagens et al. | 429/249 |
| 5,202,178 | 4/1993 | Turner et al. | 428/287 |
| 5,281,498 | 1/1994 | Muto et al. | 429/247 |
| 5,393,599 | 2/1995 | Quantrille et al. | 428/284 |
| 5,436,094 | 7/1995 | Horimoto et al. | 429/254 |
| 5,496,603 | 3/1996 | Riedel et al. | 428/40 |
| 5,508,093 | 4/1996 | Mehdorn | 428/219 |
| 5,582,901 | 12/1996 | Howey et al. | 428/198 |

FOREIGN PATENT DOCUMENTS 2098636  1/1982  United Kingdom .

OTHER PUBLICATIONS

Japan. Abstract, vol. 12, No. 318 (E–650) [3165] Aug. 29, 1988.

Japan. Abstract, vol. 7, No. 264 (E–212) [1409] Nov. 24, 1983.

*Primary Examiner*—Blaine Copenheaver
*Attorney, Agent, or Firm*—Ostrager, Chong, Flaherty & Onofrio

[57] ABSTRACT

A nonwoven composite web suitable for use as a battery separator is formed by a wet process on a papermaking machine. The nonwoven composite material is made from a furnish of nylon binder fibers and nylon staple fibers. The web coming off the papermaking machine is dried using infra-red dryers followed by heated dryer cans. After drying, the web is thermally bonded using heated calendar rolls. The nylon binder fibers melt as the web passes through the calendar rolls and thermally bond the nylon staple fibers of the web when the melted binder fiber material fuses upon cooling. The use of dryer cans to dry and partially bond the web eliminates the need for surfactant treatment to improve potassium hydroxide absorption.

20 Claims, 3 Drawing Sheets

WET-LAID NONWOVEN NYLON BATTERY SEPARATOR MATERIAL

FIELD OF THE INVENTION

This invention generally relates to synthetic nonwoven materials fabricated by wet-laid processes. In particular, the invention relates to a paper-like web made with nylon fibers which is useful as a battery separator.

BACKGROUND OF THE INVENTION

Nickel-cadmium batteries generally consist of a wound anode interleaved with a wound cathode, the wound anode and cathode being spaced apart at regular intervals in an electrolyte. The interval between the anode and cathode may be as small as 0.05 mm. Although it is desirable to place the cathode and anode close together to increase the load capacity of the battery, the electrodes must not touch to avoid producing a short circuit. To accomplish this end, separators made of suitable material are arranged between the anode and cathode to keep them apart. The separator material must be inert to the electrolyte and to the reactions occurring at the surfaces of the electrodes.

In addition, the separator material should be sufficiently elastic to conform to the shape of the electrode surfaces. Also the separator material should be sufficiently porous to allow unimpeded migration of ions between the electrodes, yet be able to filter out solid particles which separate from the electrodes and attempt to pass through the separator. The separator material further must be wettable by the liquid electrolyte to prevent the establishment of dry areas on the separator fabric. Finally, the separator should have the capacity to adsorb and store the liquid electrolyte.

Separator material made from woven fabric is disadvantageous because fabric stores insufficient quantities of the liquid electrolyte. Furthermore, because pores formed between the warp and weft of the fabric are large, solid particles which dislodge from the electrodes can pass through the fabric. Such particles accrete until a bridge is formed between an anode and cathode, giving rise to a short circuit in the battery.

It is known in the prior art that the foregoing disadvantages can be overcome by providing a battery separator material made from nonwoven nylon fabric. U.S. Pat. No. 3,344,013 to Fahrbach discloses a separator material for batteries comprising a highly porous and highly elastic structurally modified nonwoven fibrous material consisting of either nylon 6 (i.e., polycaprolactum) fibers or nylon 6—6 (i.e., polyamide) fibers or both. The separator material is manufactured by impregnating the fibrous material with a solvent consisting of a low-percentage aqueous salt solution to effect preliminary dissolution of the surface portions of nylon fibers. The impregnated nonwoven material is then squeezed under light pressure to remove excess salt solution therefrom and to initially strengthen the nonwoven material by fusing the fibers to each other at their superficially dissolved surface portions. Then the nonwoven material is dried and finally strengthened by heating.

U.S. Pat. No. 5,202,178 to Turner discloses a laminated nylon battery separator material for use in nickel-cadmium batteries. The laminate comprises a nonwoven web of nylon staple fibers sandwiched between a pair of webs of spunbonded nylon fibers. The staple web comprises nylon 6 and nylon 6,6 fibers. The spunbonded fibers are nylon 6,6. The three webs are laminated by passing them through a stack of heated calendar rolls. The maximum temperature of the stack of calendar rolls is greater than the softening temperature of the nylon 6 fibers, but less than the melting temperature of the nylon 6,6 fibers. Upon cooling, the webs of spunbonded fibers will be bonded to the staple web by the re-solidified nylon 6 fibers, whereby the laminated battery separator material is formed. In accordance with the preferred embodiment of Turner, the amount of nylon 6 may be in the range of 5–60 wt. % with the remainder being nylon 6,6 fibers.

U.S. Pat. No. 3,615,865 to Wetherell discloses a battery separator comprising a nonwoven mat of polypropylene fibers bonded with polyacrylic acid. In lieu of polypropylene fibers, polyethylene or polyamide fibers may be used.

U.S. Pat. No. 4,205,122 to Miura et al. discloses a method for manufacturing a battery separator material by subjecting an aqueous dispersion of olefinic resin fibers to a sheet-forming operation; drying the resulting wet nonwoven mat; and heat-treating the dried mat to form a self-supporting nonwoven mat. The drying and heat treatment of the nonwoven mat can be performed by passing it through a hot air dryer or "by means of dryers used in conventional papermaking machines, such as a Yankee dryer". After heat treatment, the mat is preferably calendared to increase the surface smoothness.

U.S. Pat. No. 4,216,280 to Kono et al. discloses a battery separator comprising glass fibers entangled to form a sheet and without use of a binder. Glass fibers of two types are dispersed in water and then sheet-formed by an ordinary papermaking method.

U.S. Pat. No. 4,216,281 to O'Rell et al. discloses a battery separator comprising 30–70% polyolefin synthetic pulp, 15–65% siliceous filler and 1–35% by weight of long fibers made of polyester or glass. Cellulose may be included in an amount up to 10%. The battery separator material is formed using standard papermaking equipment. The papermaking equipment disclosed in the O'Rell '281 patent comprises a pulper, a chest, a head box and a rotoformer drum which rotates in the head box to pick up slurry and form a web. The web is removed from the rotoformer drum and passed over a felt. The web is pressed by calendars. The calendared web is fed to an oven and then onto a series of heated cans. The cans feed to a windup station. In Example 1, the steam cans were operated at surface temperatures of about 270° F. The steam cans both dried the web and increased fiber bonding.

U.S. Pat. No. 4,233,379 to Gross et al. discloses a battery separator comprising 30–80 wt. % perlite granules and 20–70 wt. % glass fibers. The compositions are formed into sheets of paper using conventional papermaking techniques, i.e., the glass fibers and perlite are dispersed in a water slurry and mixed; then the mixture is deposited from the water slurry onto a conventional papermaking screen or wire, as in a Fourdrinier machine or a Rotoformer machine, to form a matted paper.

U.S. Pat. No. 4,279,979 to Benson et al. discloses a battery separator material. The major fibrous component of the material is polyolefin pulp having a prefused microfibrillar structure similar to wood pulp. The minor fibrous component is a high-tenacity polyamide fiber having a length greater than about 6 mm. The material is heat bonded by partial fusion of the microfibrillar polyolefin. The preferred polyamide is nylon, the amount of nylon fibers being preferably in the range of 10–25%, although the Benson patent states that 10–50% can be employed with satisfactory results. Alternatively, polyolefin staple fibers can be added with the polyamide fibers. The sheet material is made in accordance with conventional papermaking techniques. The major and minor fiber components are interentangled to provide sufficient structural integrity without the use of binders. The fibrous web thus formed is typically dried at drying temperatures of about 220° F. and higher. In this way the polyolefin pulp softens during drying and partially exceeds its fusion temperature, thereby bonding the web. Then the thickness of the sheet material is reduced by calendaring, which also has the effect of imparting added strength to the sheet material.

U.S. Pat. No. 4,699,858 to Nakao et al. discloses a battery separator formed of a nonwoven fabric of polyamide fibers wherein the polyamide has a $CONH/CH_2$ ratio of from 1/9 to 1/12.

U.S. Pat. No. 5,091,275 to Brecht et al. discloses a battery separator material made of a mat of glass microfibers and a binder. The glass mat is formed on a conventional papermaking machine, such as a Fourdrinier machine. The mat is then moved through an impregnating bath of an aqueous mixture of a binder.

U.S. Pat. No. 5,141,523 to Catotti et al. discloses an electrochemical cell having separator layers formed of non-woven mats of 67% nylon 6,6 and 33% nylon 6.

U.S. Pat. No. 5,158,844 to Hagens et al. discloses a battery separator in the form of a nonwoven fibrous web of water-dispersible fibers incorporating up to 65 wt. % of fibers having a high cross-sectional aspect ratio. The high aspect ratio fibers include collapsible hollow fibers and ribbon fibers that have a width 5 to 10 times greater than their thickness. The separator is produced using conventional papermaking techniques. The fibers are preferably a mixture of polyvinyl alcohol and rayon.

U.S. Pat. No. 5,281,498 to Muto et al. discloses a sheet-like battery separator for a lead acid battery. The sheet material is made from glass fibers on a papermaking machine using a wet method.

U.S. Pat. No. 5,436,094 to Horimoto et al. discloses a bulky synthetic pulp sheet useful as a separator for sealed lead batteries. The pulp sheet contains 5–95 wt. % of a synthetic pulp and 5–50 wt. % of a polymer binder. The sheet is made by subjecting a mixture of synthetic pulp and fibrous binder to wet-laid sheet-making followed by a heat treatment. The pulp can consist of polyethylene, polypropylene, polyester, nylon or other polymers. The binder may take the form of synthetic pulps, synthetic fibers, sheath-core type composite fibers, resin powders and emulsions. The type of binder selected is dependent on which kind of synthetic pulp is used as the chief material.

SUMMARY OF THE INVENTION

The present invention is a nonwoven nylon battery separator material which is formed by a wet process on a papermaking machine. Dispersion of the nylon fibers is enhanced by the addition of formation aids, such as surfactants, to the fiber slurry.

The web coming off the papermaking machine is partially dried using infra-red dryers and is then completely dried in a dryer can section. Specific dryer can temperatures are needed to facilitate drying and partial bonding of the binder fiber and also to prevent the fabric from sticking to the cans. The partially bonded fabric is thereafter thermally bonded on a calendar stack, which squeezes and bonds the material.

The foregoing wet-laid product yields a more uniform web as compared to the dry-laid product. The overall formation of a wet-laid product is greatly improved over existing dry-laid grades. Coverage of the fiber across the web is more random and not directional as in a dry-laid product. A more uniform web improves potassium hydroxide absorption in a nickel-cadmium battery. Because of this improved absorption, the life of the battery is extended. The enhanced potassium hydroxide absorption is achieved without the need for a post-drying application of surfactant.

In addition, the fiber furnish has a relatively low percentage of nylon 6 binder fibers. It has been determined that with higher amounts of nylon 6, the battery separator deteriorates at a faster rate. The reduction in nylon 6 binder fiber is projected to increase the lifetime of the battery and the number of recharges which are possible.

This invention also has the benefit of eliminating the manufacturing costs associated with dry web formation.

The nonwoven battery separator material in accordance with the preferred embodiment of the invention is a composite material comprising two types of nylon 6,6 staple fibers and nylon 6 binder fibers. The nylon 6 binder fibers melt at a temperature of 433° F. Before entering the dryer can section, the web is run through infra-red dryers to begin to drive off moisture from the sheet. The nylon 6 binder fibers soften at a temperature less than that to which the wet-laid web is subjected in the dryer can section. The partially bonded web is wound on a roll and transported to the calendar rolls. The nylon 6 binder fibers are melted as the partially bonded web passes through the heated calendar rolls. The web is completely bonded when the nylon 6 binder fibers fuse upon cooling.

In accordance with the preferred embodiment of the fiber furnish, the staple fibers are made of nylon 6,6 of two different denier and the binder fibers are made of nylon 6. The nylon 6 binder fibers preferably make up 10 to 40 wt. % of the fiber furnish, with the two different denier nylon 6,6 fiber percentages making up the balance of the furnish and in equivalent amounts. Alternatively, nylon 12/6,6 bicomponent fibers can be substituted for the nylon 6 binder fibers. The nylon 12/6,6 bicomponent fibers preferably make up 5 to 40 wt. % of the fiber furnish, with the two different denier nylon 6,6 fiber percentages making up the balance of the furnish and in equivalent amounts. These bicomponent fibers have a sheath made of nylon 12 and a core made of nylon 6,6. In accordance with a further variation, the fiber furnish may include 1 to 10 wt. % polyvinyl alcohol fibers to help give strength to the sheet during calendaring. The percentage of polyvinyl alcohol fibers is substituted for equal amounts of the two different denier nylon 6,6 fiber types, keeping the percentage of nylon 6 binder fibers or nylon 12/6,6 bicomponent fibers unchanged.

The component fibers are combined with water into a homogeneous mixture and formed into a mat employing a wet-lay process. A high strength paper-like material is formed by thermally bonding the mat under controlled temperature and pressure conditions.

DETAILED DESCRIPTION OF THE PREFERRED EMBODIMENTS

Figure 1:
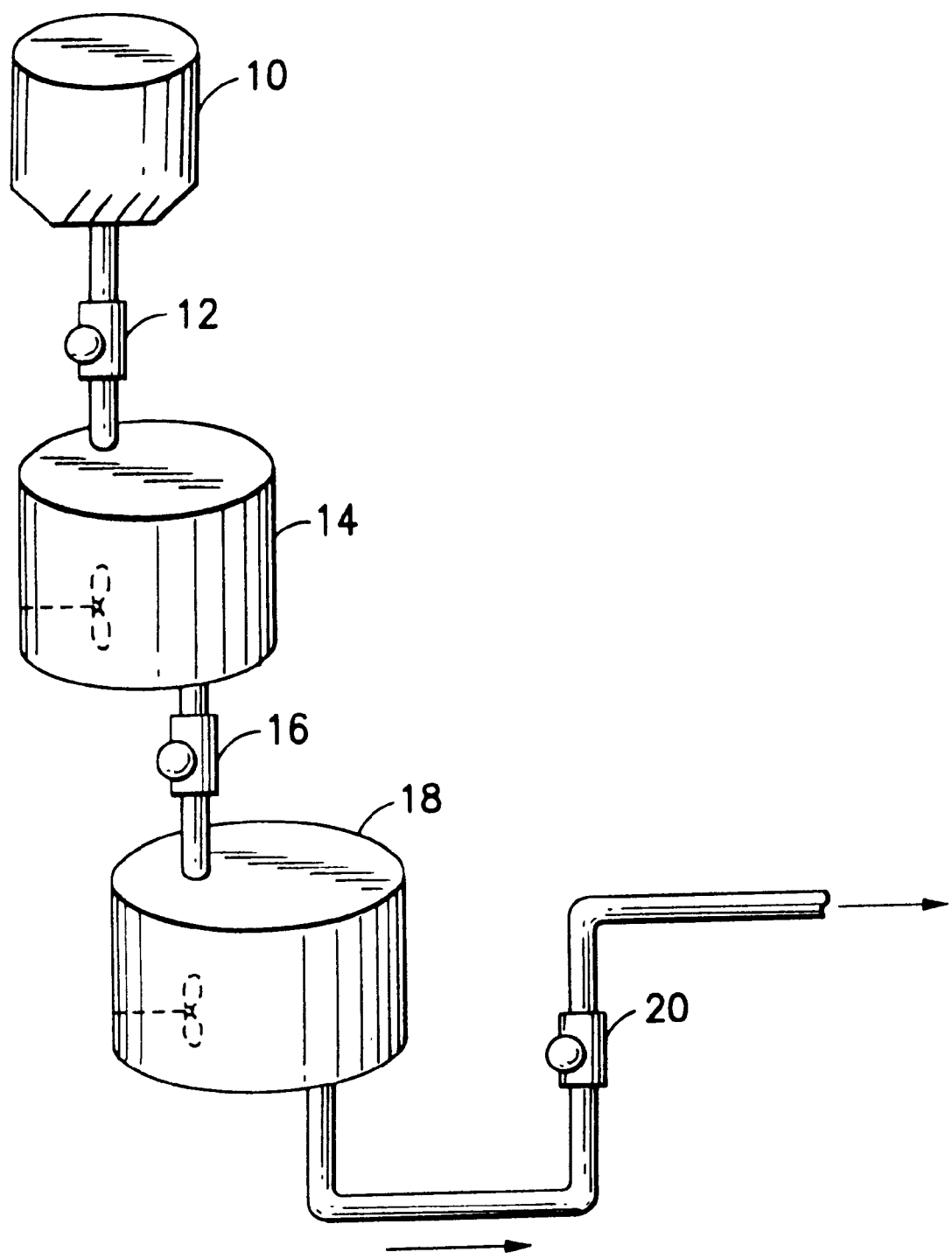
FIG. 1 is a diagrammatic view of an apparatus for preparation of stock or furnish for manufacture of the composite material of the invention.

In accordance with a first preferred embodiment of the invention, the fiber furnish comprises 10 to 40 wt. % of nylon 6 binder fibers, 30 to 45 wt. % of nylon 6,6 fibers having a first denier, and 30 to 45 wt. % of nylon 6,6 fibers having a second denier greater than the first denier. In accordance with a second preferred embodiment of the invention, the fiber furnish comprises 5 to 40 wt. % of nylon 12/6,6 bicomponent fibers, 30 to 47.5 wt. % of nylon 6,6 fibers having a first denier, and 30 to 47.5 wt. % of nylon 6,6 fibers having a second denier greater than the first denier. The nylon 12 sheath of the bicomponent fibers melts at a temperature below the melting temperature of the nylon 6,6 material, enabling preliminary bonding of the web in the steam-heated dryer section. In accordance with a third preferred embodiment of the invention, the fiber furnish comprises 10 to 40 wt. % of nylon 6 binder fibers, 25 to 44.5 wt. % of nylon 6,6 fibers having a first denier, 25 to 44.5 wt. % of nylon 6,6 fibers having a second denier greater than the first denier, and 1 to 10 wt. % of polyvinyl alcohol fibers. The polyvinyl alcohol fibers are preferably added at 3 wt. % for the purpose of providing initial bonding of the web before final bonding in the calendaring stack. In accordance with a fourth preferred embodiment of the invention, the fiber furnish comprises 5 to 40 wt. % of nylon 12/6,6 bicomponent fibers, 25 to 47 wt. % of nylon 6,6 fibers having a first denier, 25 to 47 wt. % of nylon 6,6 fibers having a second denier greater than the first denier, and 1 to 10 wt. % of polyvinyl alcohol fibers.

The preferred fiber furnishes in accordance with the first preferred embodiment are as follows: (1) 40 wt. % nylon 6 binder fibers (1.7 dtex×12 mm), 30 wt. % nylon 6,6 fibers (0.7–0.9 denier×½") and 30 wt. % nylon 6,6 fibers (3.0 denier×¾"); and (2) 10 wt. % nylon 6 binder fibers (1.7 dtex×12 mm), 45 wt. % nylon 6,6 fibers (0.7 denier×½") and 45 wt. % nylon 6,6 fibers (3.0 denier×¾").

A nonwoven battery separator material is formed by a wet-laying process on a conventional papermaking machine. Then the nonwoven material is thermally bonded under controlled temperature and pressure conditions. In accordance with the method of the invention, a wet-laid mat of the composite material is dried at temperatures in the range of 150–325° F. and then thermally calendared with rolls heated to temperatures in the range of 250–450° F. and nip pressures of 150–250 psi. The weight per unit area of the composite following thermal calendaring can be varied from 60 to 85 gm/m$^2$ depending on the sheet composition and the calendaring conditions chosen to effect a certain set of physical properties. Nylon staple fibers of 0.2 to 3.0 denier can be used and blended in various ratios to effect desired physical properties.

FIG. 1 illustrates an apparatus for preparation of stock or furnish for manufacture of the composite in accordance with the preferred embodiment. A batch of nylon fibers is prepared in a hydropulper 10, which contains water. In preparation of the slurry, the water is agitated, surfactant is added, and the nylon fibers are introduced into the furnish in the following sequence: (1) 3.0 denier×¾" nylon 6,6 staple fibers; (2) 0.7 denier×½" nylon 6,6 staple fibers; and (3) nylon 6 binder fibers. The preferred surfactant is F-108, which is a polyoxypropylene-polyoxyethylene block copolymer. F-108 surfactant is commercially available from BASF Corporation and is added at 10 pounds per 12,000 gallons of water. After all of the fibers have been added to the furnish, the furnish is mixed for approximately 2 to 5 minutes to disperse the nylon fibers. A web formation aid, e.g., an anionic polyacrylamide, is added to the furnish. The preferred formation aid is Reten 235, which is an anionic acrylamide copolymer. Reten 235 is supplied by Hercules Inc. Four hundred gallons of Reten 235 are added at 0.3% per 12,000 gallons of water. Thereafter the slurry is mixed for a sufficient time to disperse the nylon fibers in a uniform fashion. Visual inspection is used to determine when the fibers are totally separated and well dispersed.

In the alternative, instead of adding 400 gallons of Reten 235, 3.2 gallons of Nalco 7534 polyacrylamide from Nalco, Inc. and 48 gallons of I-14 acrylamide from Parachem are added to the furnish.

The volume of water and amount of fiber is such that the consistency of the furnish in the hydropulper 10 is about 3.6% solids. After the fibers have been dispersed in a uniform fashion, the fiber slurry is transported to mixing chest 14 via valve 12. In mixing chest 14 the nylon fiber slurry is diluted to the desired consistency, i.e., approximately 0.9% solids, adding water to 12,000 gallons. After the nylon fiber slurry has been suitably mixed in mixing chest 14, the slurry is transported via opened valve 16 to the machine chest 18, where the slurry is further diluted to a consistency of approximately 0.6% solids. Thereafter, the slurry is transported to the web-forming machine via valve 20.

Figure 2:
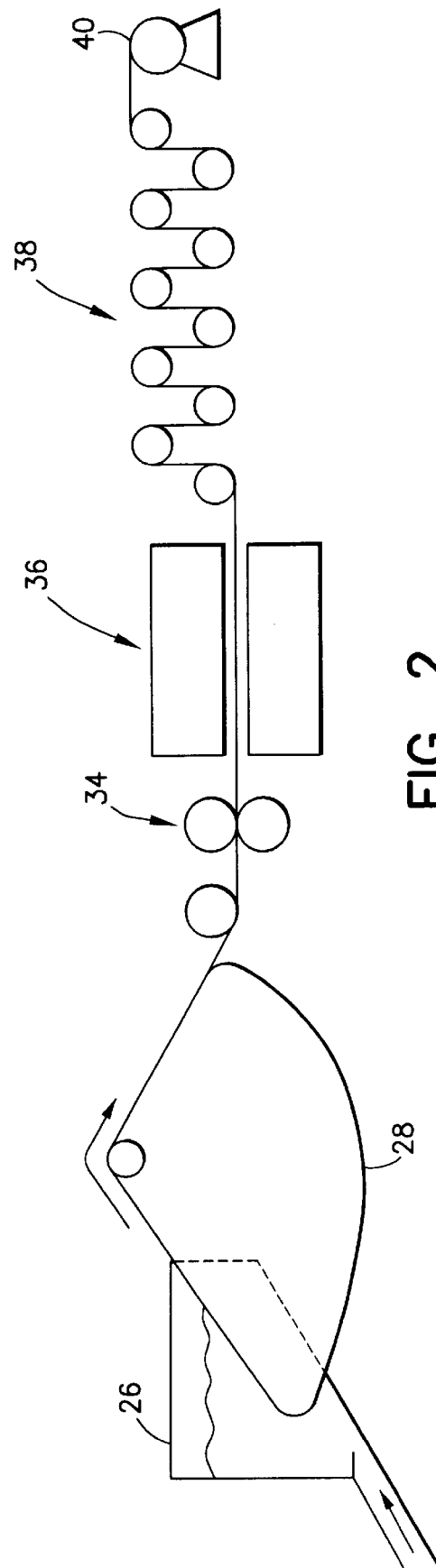
FIG. 2 is a diagrammatic view of an apparatus for formation and drying of a web employed in the manufacture of the composite material.

FIG. 2 is a diagrammatic view of an apparatus for formation and drying of a web employed in the manufacture of the composite in accordance with the invention. The homogeneous fiber slurry is received by headbox 26. In the headbox, the slurry has a consistency of about 0.05% solids. A web 32 is formed by machine 28 using a wet-lay process in accordance with conventional papermaking techniques. Preferably machine 28 is an inclined wire Fourdrinier machine. Alternatively, a Rotoformer, a cylinder or a flat wire Fourdrinier machine can be used. The temperature which the fibers are exposed to on the inclined wire Fourdrinier machine lies in the range of 70–85° F. Thereafter, the web 32 passes through a pair of wet press rolls 34, which remove excess water from the web. The web then enters an infra-red dryer 36. After preliminary drying in the infra-red dryer section, the web enters a dryer can section 38 comprising a stack of dryer cans. The temperatures of the dryer cans should lie in the ranges given in Table 1.

TABLE 1

| Dryer Can Temperatures | |
|---|---|
| Dryer Can No. | Temperature (° F.) |
| 1 | 315–325 |
| 2 | 300–325 |
| 3 | 300–325 |
| 4 | 225–250 |
| 5 | 225–250 |
| 6 | 200–225 |
| 7 | 200–225 |
| 8 | 200–225 |
| 9 | 150–200 |
| 10 | 150–200 |

The foregoing specific temperatures are required to facilitate drying and partial bonding of the binder fiber and also to prevent sticking to the cans. As the web is passed over the dryer cans, the nylon 6 softens and begins to melt, which starts the bonding of the nylon 6 and nylon 6,6 fibers. The major amount of bonding takes place during the web running through the first eight dryer cans. The cans are reduced in temperature as the web passes through in order to minimize shrinkage. The dried web 32 is then wound up on a reel 40 for further processing.

Figure 3:
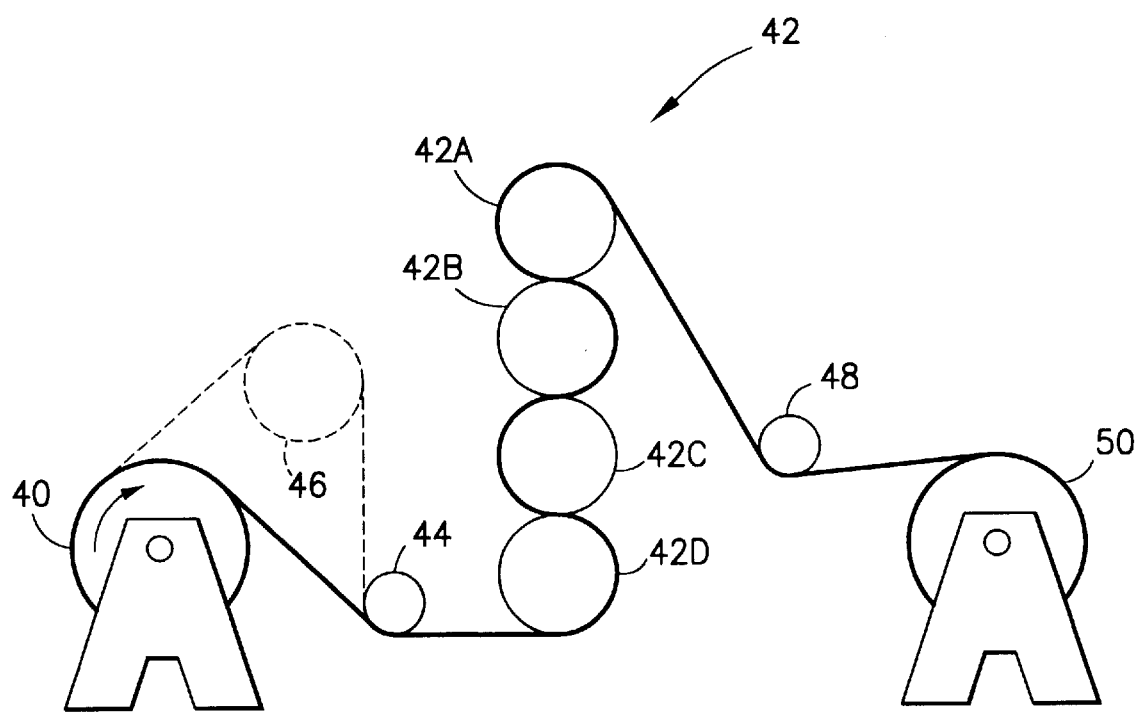
FIG. 3 is a diagrammatic view of an apparatus for thermally bonding the web to form the composite material of the invention.

A high-strength and densified composite material is provided by thermally bonding the dried web 32 in a calendar stack 42, as shown in FIG. 3. On the process line, the web 32 is unwound from the reel 40, and fed by guide roll 44 to the nip between a stack of calendar rolls 42A–42D. Calendar rolls 42A–42D, which are preferably fabricated of steel, are heated to a temperature and maintained at a compression pressure in the range of 250–450° F. and of 800–1,000 pli. Thickness values ranging from 5 to 10 mils and air permeability values ranging from 25 to 200 cfm were obtained by calendaring with the rolls having the temperature range of 250–450° F. Preferred results are obtained at a temperature of approximately 400° F. and pressure of 800 pli. Alternatively, the rolls could be cotton filled or Teflon coated to improve fiber tie-down. After thermal bonding in the calendar rolls, the web contacts guide roll 48 and is then wound up on a reel 50.

In the alternative, the web can be partially wrapped around a roll 46 (shown by dashed lines in FIG. 3) which is heated to a temperature of about 200–300° F. and then passed between the calendar rolls. The heated roll 46 preheats the web before it enters the calendaring roll nip. Preheating allows a faster speed of the production line.

Table 2 sets forth physical properties of the preferred embodiment having 60 wt. % nylon 6,6 and 40 wt. % nylon 6 both before and after thermal bonding.

TABLE 2

Physical Properties of 40 wt. % Nylon 6 Embodiment

| TAPPI* No. | Physical Property | Uncalendared | Calendared |
|---|---|---|---|
| 410 | Basis Weight (3000 ft²) | 38.6 | 39.5 |
| 411 | Caliper (mils) | 9.7 | 5.98 |
| 251 | Porosity-Permeability, Frazier Air (cfm) | 203 | 111.1 |
| 494 | Instron Tensile (lb/in.) (MD/CD) | 18.2/3.4 | 35.4/5.16 |

*Standards of the Technical Association of the Pulp and Paper Industry ("TAPPI"), Technology Park, Atlanta, Georgia.

Table 3 sets forth physical properties of the preferred embodiment having 90 wt. % nylon 6,6 and 10 wt. % nylon 6 both before and after thermal bonding.

TABLE 3

Physical Properties of 10 wt. % Nylon 6 Embodiment

| TAPPI No. | Physical Property | Uncalendared | Calendared |
|---|---|---|---|
| 410 | Basis Weight (3000 ft²) | 40.7 | 40.7 |
| 411 | Caliper (mils) | 10.9 | 6.59 |
| 251 | Porosity-Permeability, Frazier Air (cfm) | 294.8 | 77.4 |
| 494 | Instron Tensile (1) (MD/CD) | 10.14/0.44 | 11.3/1.65 |

The calendared composite exhibits a microstructure in which fiber interfaces are fused due to melting of the nylon 6 binder fiber material. The nylon 6 has a melting point lower than that of the nylon 6,6 staple fibers. The calendaring of the composite web effects a reduction in the fiber spacing, i.e., by fiber compression and bonding. The density of the web material and the flatness (levelness) of the surface of the web material are substantially enhanced in the calendaring process.

The foregoing preferred embodiments have been described for the purpose of illustration only and are not intended to limit the scope of the claims hereinafter. Variations and modifications of the composition and method of manufacture may be devised which are nevertheless within the scope and spirit of the invention as defined in the claims appended hereto. For examples, it will be apparent to practitioners of ordinary skill that nylon binder fibers different than those specified herein may be used, so long as the nylon binder fiber material has a melting point lower than that of the nylon staple fibers and provides adequate bonding of those nylon staple fibers to form a nonwoven web with high tensile strength. In addition, nylon staple fibers of 0.2 to 3.0 denier can be used and blended in various ratios to effect desired physical properties. The range and blend of binder fibers may also be varied to effect desired physical properties. Furthermore, the physical properties as well as the performance of the sheet material can be altered to fit a particular set of physical specifications by adjusting the furnish composition and ratio as well as the calendaring parameters. The length and denier of the nylon fibers may be varied provided that the air permeability of the calendared sheet lies in the range of 75–200 cfm. Sheet basis weights may also vary from 60 to 85 gm/m² depending on the sheet fiber composition and the calendaring conditions chosen to effect a certain set of physical properties. All such variations and modifications are intended to be encompassed by the claims set forth hereinafter.

We claim:

1. A nonwoven web made by the following steps:

creating a fiber furnish having the following fiber composition: 10 to 40 wt. % of nylon 6 binder fibers and 60 to 90 wt. % of nylon 6,6 staple fibers;

mixing said fiber furnish to disperse said nylon 6 binder fibers and said nylon 6,6 staple fibers;

laying said fiber furnish on a papermaking machine to form a wet-laid web;

removing water from said wet-laid web; and thermal bonding said wet-laid web after said water removing step, said thermal bonding being performed at temperatures which cause the nylon 6 binder fibers to melt without causing the nylon 6,6 staple fibers to melt.

2. The nonwoven web as defined in claim 1, wherein said nylon 6,6 fibers comprise a first type of nylon 6,6 staple fiber having a first denier and a second type of nylon 6,6 staple fiber having a second denier different than said first denier.

3. The nonwoven web as defined in claim 2, wherein said first denier is about 0.7 and said second denier is about 3.0.

4. The nonwoven web as defined in claim 2, wherein said first type of nylon 6,6 fibers comprise 30–45 wt. % of the fiber composition and said second type of nylon 6,6 fibers comprise 30–45 wt. % of the fiber composition.

5. The nonwoven web as defined in claim 1, wherein said thermal bonding is performed by calendaring with heated calendar rolls.

6. The nonwoven web as defined in claim 1, wherein said water removing step is performed by drying in an infra-red dryer followed by drying on a dryer can stack.

7. A nonwoven web made by the following steps:

creating a fiber furnish having the following fiber composition: 5 to 40 wt. % of bicomponent fibers having a nylon 6,6 core and a sheath made of nylon binder material having a melting temperature less than the melting temperature of nylon 6,6 and 60 to 95 wt. % of nylon 6,6 staple fibers;

mixing said fiber furnish to disperse said bicomponent fibers and said nylon 6,6 staple fibers;

laying said fiber furnish on a papermaking machine to form a wet-laid web;

removing water from said wet-laid web; and thermal bonding said wet-laid web after said water removing step, said thermal bonding being performed at temperatures which cause the nylon binder material to melt without causing the nylon 6,6 staple fibers to melt.

8. The nonwoven web as defined in claim 7, wherein said nylon 6,6 fibers comprise a first type of nylon 6,6 staple fiber having a first denier and a second type of nylon 6,6 staple fiber having a second denier different than said first denier.

9. The nonwoven web as defined in claim 8, wherein said first denier is about 0.7 and said second denier is about 3.0.

10. The nonwoven web as defined in claim 8, wherein said first type of nylon 6,6 fibers comprise 30–45 wt. % of the fiber composition and said second type of nylon 6,6 fibers comprise 30–45 wt. % of the fiber composition.

11. The nonwoven web as defined in claim 7, wherein said thermal bonding is performed by calendaring with heated calendar rolls.

12. The nonwoven web as defined in claim 7, wherein said water removing step is performed by drying in an infra-red dryer followed by drying on a dryer can stack.

13. The nonwoven web as defined in claim 7, wherein said nylon binder material is nylon 12.

14. A nonwoven web made by the following steps:
creating a fiber furnish having the following fiber composition: 10 to 40 wt. % of nylon 6 binder fibers, 50 to 89 wt. % of nylon 6,6 staple fibers and 1 to 10 wt. % of polyvinyl alcohol fibers;

mixing said fiber furnish to disperse said nylon 6 binder fibers, said nylon 6,6 staple fibers and said polyvinyl alcohol fibers;

laying said fiber furnish on a papermaking machine to form a wet-laid web;

removing water from said wet-laid web; and thermal bonding said wet-laid web after said water removing step, said thermal bonding being performed at temperatures which cause the nylon 6 binder fibers to melt without causing the nylon 6,6 staple fibers to melt.

15. The nonwoven web as defined in claim 14, wherein said nylon 6,6 fibers comprise a first type of nylon 6,6 staple fiber having a first denier and a second type of nylon 6,6 staple fiber having a second denier different than said first denier.

16. The nonwoven web as defined in claim 14, wherein said water removing step is performed by drying in an infra-red dryer followed by drying on a dryer can stack.

17. A nonwoven web made by the following steps:
creating a fiber furnish having the following fiber composition: 5 to 40 wt. % of bicomponent fibers having a nylon 6,6 core and a sheath made of nylon binder material having a melting temperature less than the melting temperature of nylon 6,6, 50 to 94 wt. % of nylon 6,6 staple fibers and 1 to 10 wt. % of polyvinyl alcohol fibers;

mixing said fiber furnish to disperse said bicomponent fibers, said nylon 6,6 staple fibers and said polyvinyl alcohol fibers;

laying said fiber furnish on a papermaking machine to form a wet-laid web;

removing water from said wet-laid web; and thermal bonding said wet-laid web after said water removing step, said thermal bonding being performed at temperatures which cause the nylon binder material to melt without causing the nylon 6,6 staple fibers to melt.

18. The nonwoven web as defined in claim 17, wherein said nylon 6,6 fibers comprise a first type of nylon 6,6 staple fiber having a first denier and a second type of nylon 6,6 staple fiber having a second denier different than said first denier.

19. The nonwoven web as defined in claim 17, wherein said water removing step is performed by drying in an infra-red dryer followed by drying on a dryer can stack.

20. The nonwoven web as defined in claim 17, wherein said nylon binder material is nylon 12.

* * * * *